C. E. LORD.
DYNAMO ELECTRIC MACHINE.
APPLICATION FILED MAY 17, 1906.

923,673.

Patented June 1, 1909.
3 SHEETS—SHEET 1.

WITNESSES

INVENTOR

C. E. LORD.
DYNAMO ELECTRIC MACHINE.
APPLICATION FILED MAY 17, 1906.

923,673.

Patented June 1, 1909.
3 SHEETS—SHEET 2.

WITNESSES
Oliver Sherman
Fred J. King

INVENTOR
Chas. E. Lord

C. E. LORD.
DYNAMO ELECTRIC MACHINE.
APPLICATION FILED MAY 17, 1906.

923,673.

Patented June 1, 1909.
3 SHEETS—SHEET 3.

WITNESSES
Olivru W Sharman
Fred J Kinsey

INVENTOR
Chas. E. Lord

UNITED STATES PATENT OFFICE.

CHARLES E. LORD, OF NORWOOD, OHIO, ASSIGNOR TO ALLIS-CHALMERS COMPANY, A CORPORATION OF NEW JERSEY.

DYNAMO-ELECTRIC MACHINE.

No. 923,673.      Specification of Letters Patent.      Patented June 1, 1909.

Application filed May 17, 1906. Serial No. 317,281.

*To all whom it may concern:*

Be it known that I, CHARLES E. LORD, citizen of the United States, residing at Norwood, in the county of Hamilton and State of Ohio, have invented certain new and useful Improvements in Dynamo-Electric Machines, of which the following is a full, clear, and exact specification.

My invention relates to improvements in dynamo-electric machines and particularly in those having inwardly extending field poles.

My present invention contains some features in common with my co-pending application Serial No. 314,920, filed May 3, 1906, but all claims relating to such common features are in said co-pending application.

In the usual construction of dynamo-electric machines having inwardly extending field poles, such as inclosed motors, the parts are cooled by air drawn into the ends of the rotor cores and forced outward through the circumferential passageways against and around the field coils, by the fan like action of the rotor. This system of ventilation has sometimes been found inadequate to prevent a dangerous rise of temperature in certain parts of the machines, such as the field poles, through which, as the machines are ordinarily constructed, the air can not circulate. Furthermore in high speed machines, the air flowing outward through the passageways of the rotor, and impinging against the field coils and field poles, causes a very disagreeable noise.

The object of my invention is to so construct dynamo-electric machines, particularly of the inclosed type, and to so arrange the ventilating passageways, that all parts will be properly cooled and the noise due to the passage of air reduced to a minimum.

My invention consists in the details of construction, and in the combinations and arrangements of parts described in the specification and set forth in the appended claims.

For a better understanding of my invention, reference is now had to the accompanying drawings in which—

Figure 1:
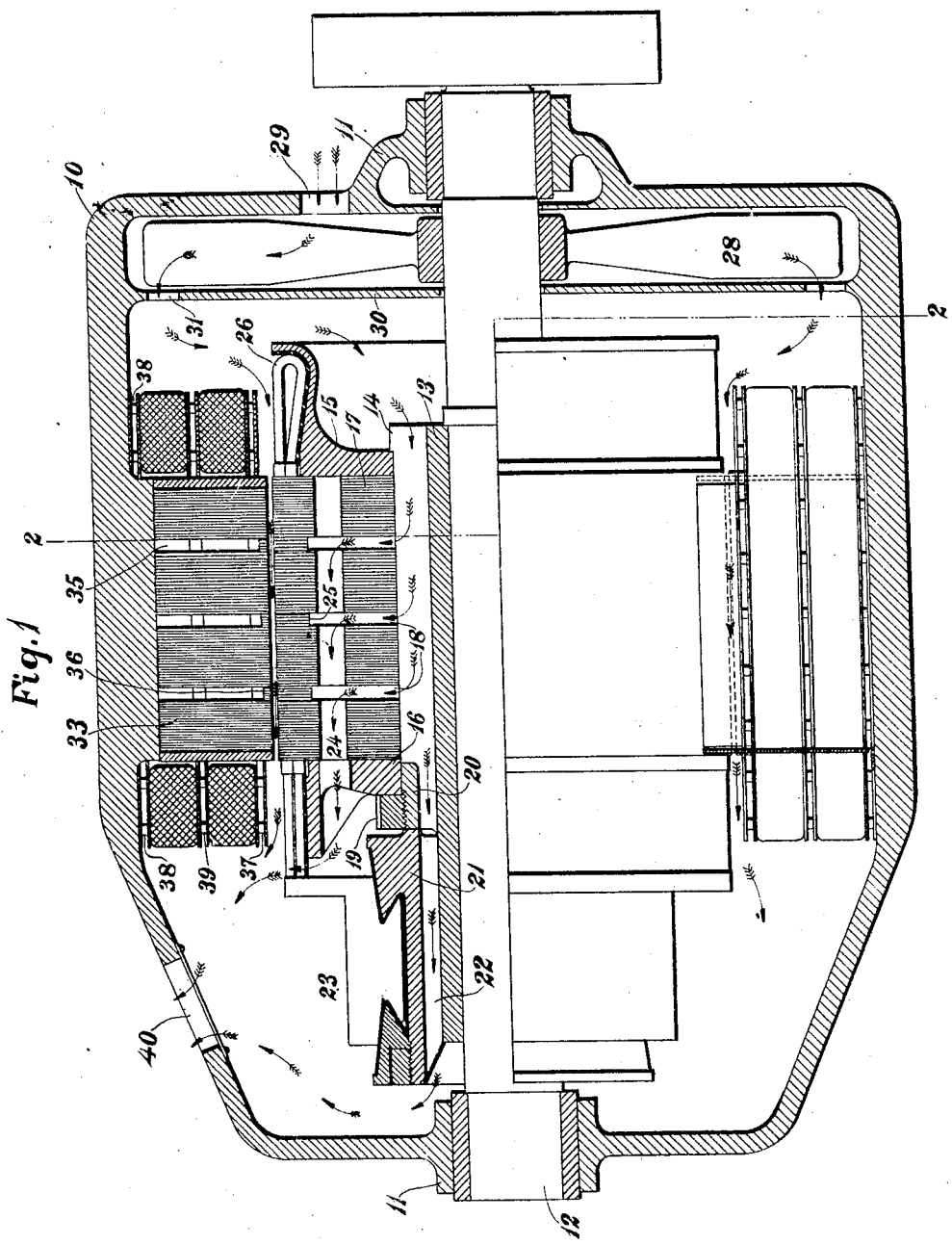
Figure 2:
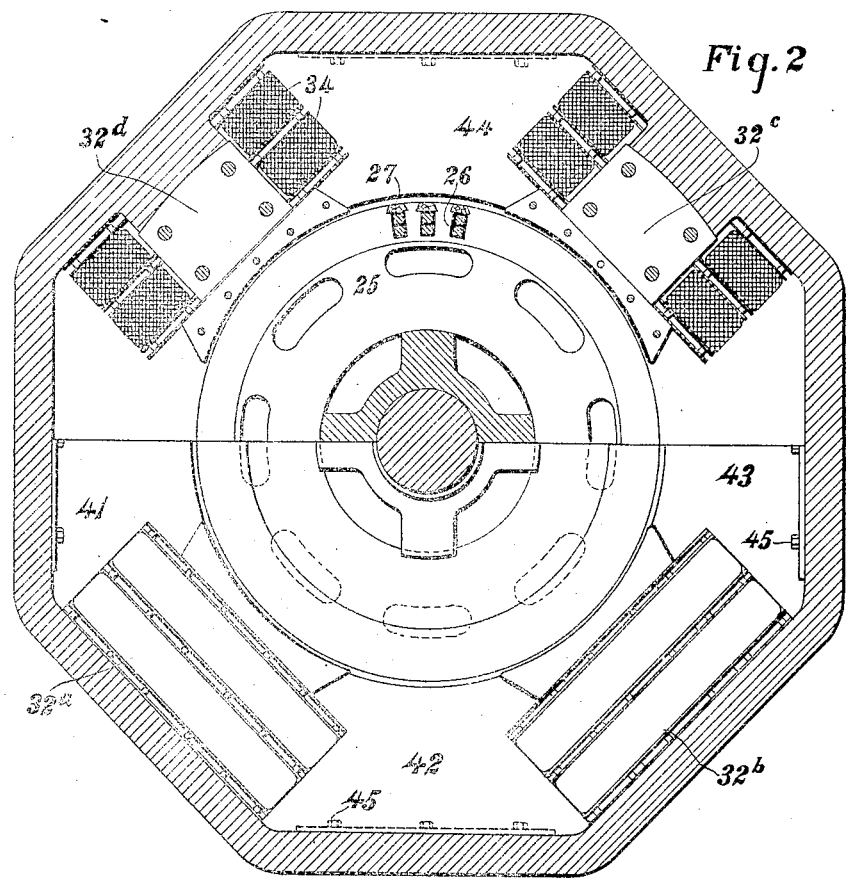
Figure 3:
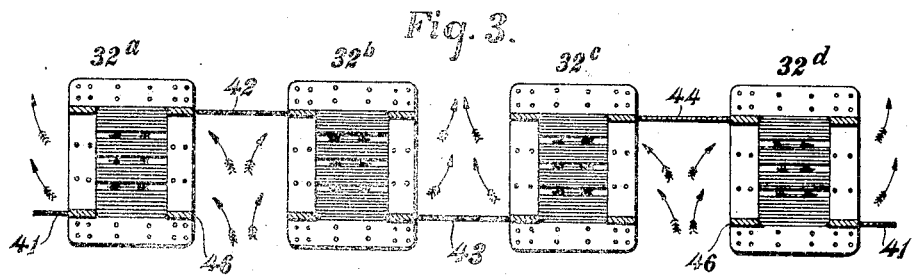
Figure 4:
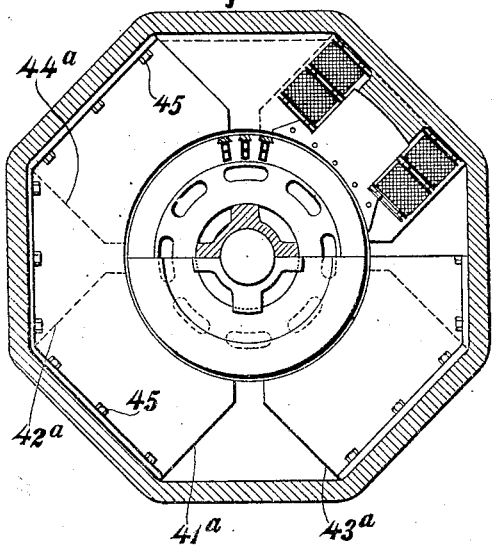
Figure 7:
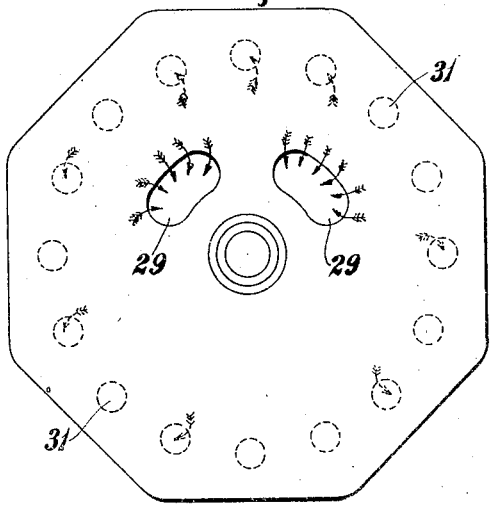
Figure 5:
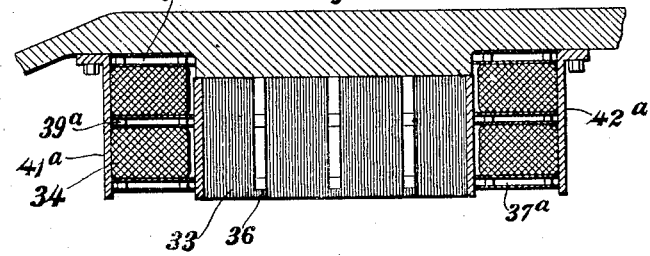
Figure 6:
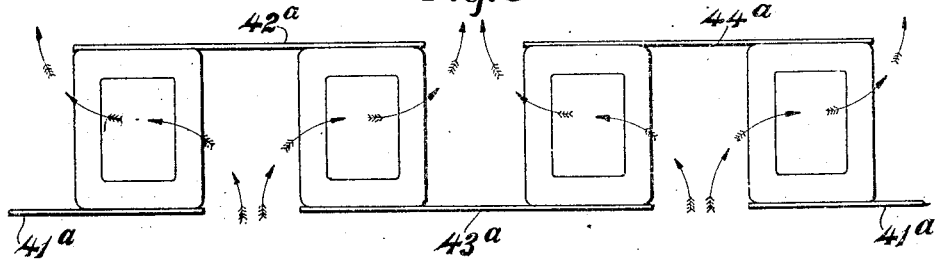

Figure 1 is a sectional elevation of a dynamo-electric machine of the inclosed motor type constructed according to my invention; Fig. 2 is a transverse vertical section substantially along the irregular line 2—2 of Fig. 1; Fig. 3 is a developed section through all the field poles showing the preferred means for directing air through the passages of the poles; Fig. 4 is a transverse section of a machine involving a modification of my invention; Fig. 5 is an enlarged section through a field pole and frame of the machine shown in Fig. 4; Fig. 6 is a development of the poles of the machine shown in Figs. 4 and 5, showing the means for directing the air through the passageways of the poles; and Fig. 7 is an end view of the casing showing the location of the air inlet openings.

Referring now to the figures of the drawing, I have shown at 10 the frame of an inclosed motor of the railway type. My invention is not limited, however, to machines of this type. Mounted in journal bearings 11 at the ends of the casing is a shaft 12, having an armature spider or sleeve 13 which is provided with radial ribs or arms 14. Mounted on the sleeve and held between end heads 15 and 16 is a laminated core 17, the laminæ being arranged in groups and spaced apart forming circumferential ventilating passageways 18. The end-head 16 is held in place by a nut 19 engaging teeth on the ring 20 integral with the ribs or arms 14. The sleeve 13 extends beyond the armature core 17, this portion not being provided with the ribs or arms 14. Mounted on this extension of the armature sleeve is the commutator spider 21 having inwardly extending ribs 22 engaging the shaft. The commutator bars 23 are secured to this spider in the customary manner. It is seen that the arms or ribs of the armature sleeve or spider and of the commutator spider form axial ventilating passageways which are open at both ends of the machine, and which communicate with the circumferential ventilating passageways 18 of the core. The core is also formed with axial air passageways 24 more remote from the shaft and also communicating with the circumferential passageways 18. These axial passageways 24 are open at one end of the machine only, and, as will appear later, form air outlet openings for the core.

In order that air may not be forced outward against the field poles by the fan-like action of the rotor, I close all the circumferential openings at the periphery of the core. I prefer to employ for this purpose auxiliary laminæ of magnetic material 25, so that the field flux will be evenly distributed along the armature, reducing the density of the flux in the main laminæ at the periphery of the core and hence reducing the iron losses and the heat due thereto. The core is slotted in the customary manner and is provided with armature coils 26. The laminæ 25 extend inwardly from the periphery only a short distance beyond the armature coils, so that the air will circulate in the core as near to the coils as possible. The auxiliary laminæ 25 are held in position mainly by the armature coils 26, and wedges 27 employed to hold the coils in place. The usual separating segments may be employed within the core to assist the laminæ 25 in holding the group of main laminæ apart.
Mounted on the shaft at one end of the casing is a fan 28. The end of the casing is provided with air inlet openings 29 (shown in Figs. 1 and 7), which openings are in this case shown above the shaft, so that water or snow will not readily enter the casing while the car to which the motor is attached is in motion. The fan is separated from the motor proper by a partition 30 provided, near the outer walls of the casing, with a number of openings 31 (shown in Figs. 1 and 7). The paths of the air currents through the armature core and field magnets will be explained later.

Extending radially inward from the field frame 10 are the field magnets $32^a$, $32^b$, $32^c$ and $32^d$, each comprising a laminated field pole 33 and the field coils 34. The laminæ of the poles are arranged in groups which are spaced apart in any desired manner forming parallel circumferential ventilating passageways 35 at right angles to the axis of the machine. These passageways are closed at the inner ends of the poles by laminæ 36 of magnetic material. The laminæ 36, as in the case of the armature provide a more even distribution of flux and decrease the density of the flux and hence the iron losses in the main laminæ of the poles. The coils 34 of the field magnets are held between inner and outer coil-seats 37 and 38 which are so constructed that air can readily pass through them. In this case each seat consists of two parallel plates spaced apart by lugs. The coils are also divided into two sections spaced apart by a collar, frame, or separator 39 similar in construction to the coil seats.

In order that the air from the fan may not pass directly from one end of the casing to the other through the spaces between the field magnets I provide plates or barriers so arranged that most of the air that enters the spaces between the field magnets is directed through the passageways in the field magnets in passing from the fan to the outlet opening 40. In the preferred form of my invention, barriers 41, 42, 43 and 44 are placed between the field magnets alternately at opposite ends of the poles. These barriers fit closely against the coils and are pref-
erably secured to the casings by screws 45. The arrangement of the barriers is most clearly shown in Fig. 3. It is seen that barriers 41 and 43 are located between field magnets $32^a$ and $32^d$ and between field magnets $32^b$ and $32^c$ respectively at the ends of the magnets adjacent the fan 28, and barriers 42 and 44 are located between field magnets $32^a$ and $32^b$ and between field magnets $32^c$ and $32^d$ respectively at the opposite ends of the magnets. Located between the plates of the coil seats 37 and 38 and collar 39 in line with the barriers 41 are blocks 46 (see Fig. 3) which assist the plates in directing the air into the passageways of the pole pieces. The result of this construction is that air from the fan enters the spaces between field magnets $32^a$ and $32^b$ and between field magnets $32^c$ and $32^d$ and, being prevented from passing directly through the spaces, enters the passageways in all the field magnets and after passing through the said passageways passes to the spaces between field magnets $32^a$ and $32^d$, and between field magnets $32^b$ and $32^c$, and then out of the casing by the outlet opening 40.

In Figs. 4, 5 and 6 I have shown a slight modification. As in the preceding case, the field magnets are provided with coil seats $37^a$ and $38^a$ and an intermediate separating frame $39^a$, constructed to permit a circulation of air into the passageways of the poles. In this modification the air is directed into the field magnets by plates $41^a$, $42^a$, $43^a$, and $44^a$ (shown most clearly in Fig. 6) which are arranged at the ends of the magnets instead of between the magnets and each completely covers the ends and the space between two adjacent magnets. The air is directed through the magnets in the same manner as in the construction first described.

I have described my invention in connection with a four pole machine, but it is evident that it can be applied equally well to machines having any other number of poles.

When the armature is rotated, air is drawn into the casing at the inlet openings 29 and passes to the outlet opening at the opposite end of the casing through all parts of the machine. The air enters the armature or rotor at the axial openings adjacent the shaft, part passing along the shaft to the opposite end of the casing and part entering the circumferential passageways and escaping through the axial openings 24 as indicated by the arrows. A small portion of the air passes from one end of the machine to the other through the air gap as indicated, and the remaining portion passes through the field magnets as is indicated by the arrows and as was described. Thus it is seen that all parts are exposed to the cooling air currents more completely than in the previous constructions without any air being forced radially outward from the armature or rotor, resulting in a smaller temperature rise and an elimination of the disagreeable noise heretofore present at high speeds of rotation.

It is evident that many changes can be made in the details of construction and the arrangements of parts and air passageways without involving a departure from the spirit and scope of my invention.

What I claim as new and desire to secure by Letters Patent is:—

1. In a dynamo-electric machine, a frame, field poles extending inwardly therefrom, said field poles having parallel ventilating passageways at right angles to the axis of machine, and means for closing the passageways at the inner ends of the poles.

2. In a dynamo-electric machine, a frame, field poles extending inwardly therefrom, each of said poles having circumferential parallel ventilating passageways, and strips of magnetic material for closing the passageways at the inner ends of the poles.

3. In a dynamo-electric machine, a frame, laminated field poles extending inwardly therefrom, the laminæ being arranged in groups forming ventilating passageways, and means for closing the passageways at the inner ends of the poles.

4. In a dynamo-electric machine, a frame or casing, laminated field poles extending inwardly therefrom, each of the poles having the laminæ arranged in groups forming ventilating passageways, and laminated means for closing the passageways at the inner ends of the poles.

5. In a dynamo-electric machine, a casing, laminated field poles secured thereto, said field poles having ventilating passageways closed at the inner ends of the poles, and field coils surrounding the poles.

6. In a dynamo-electric machine, a field frame, field magnets extending inwardly therefrom, said field magnets comprising laminated field poles having parallel ventilating passageways between the laminæ, said passageways being closed at the ends of the poles, and field coils so arranged that said passageways communicate with the spaces between the field magnets.

7. In a dynamo-electric machine, a field casing, field magnets extending inwardly therefrom, said field-magnets having laminated poles provided with parallel ventilating passageways which communicate with the spaces between the field magnets, means for forcing air from one end of the machine to the other, and means associated with said field magnets for directing air through the passageways in the field magnets.

8. In a dynamo-electric machine, a field-casing, field-magnets extending inwardly therefrom, said field magnets having laminated poles provided with parallel ventilating passageways which are closed at the ends of the poles and which communicate with the spaces between the poles, means for forcing air through the casing, and means associated with the field magnets for directing the air through the passageways in the field poles.

9. In a dynamo-electric machine, a field-casing, field magnets extending inwardly therefrom, said field magnets having laminated poles provided with parallel ventilating passageways between the laminæ, means for forcing air through the casing, and barriers arranged between the field magnets in such a manner that air is directed through the passageways in the poles in passing from one end of the casing to the other.

10. In a dynamo-electric machine, a field casing having inwardly extending field magnets provided with ventilating passageways closed at the ends of the poles and which communicate with the spaces between the poles, and plates for closing the passageways between adjacent poles, the plates between adjacent pairs of poles being at opposite sides of the poles, and means for forcing air through the machine.

11. In a dynamo-electric machine, a casing provided with inwardly extending field-magnets comprising laminated field poles and coils, each of said poles having parallel ventilating passageways between the laminæ, said passageways communicating with the spaces between the field magnets, plates for closing one end of each of the spaces between the field magnets, the plates being alternately arranged at opposite sides of the field magnets, and a fan at one end of the casing for forcing air into the spaces open toward the fan, through the passageways of all the field magnets and into the spaces between the poles open toward the opposite end of the machine.

12. In a dynamo-electric machine, a rotor comprising a laminated core having parallel circumferential ventilating passageways closed at the outer periphery of the core, said core having axial inlet and outlet passageways communicating with the circumferential passageways, one set of said axial passageways being open at only one end of the rotor.

13. In a dynamo-electric machine, a rotor comprising a core made up of groups of laminated magnetic material spaced apart to form parallel circumferential ventilating passageways, and means having a good magnetic conductivity for closing the passageways at the periphery of the rotor, said core having axial inlet and outlet passageways communicating with the circumferential passageways.

14. In a dynamo-electric machine, a rotor comprising a laminated core having circumferential ventilating passageways, and means comprising laminated magnetic material for closing the circumferential passageways at the periphery of the rotor, said core having axial passageways communicating with said circumferential passageways.

15. In a dynamo-electric machine, a rotor consisting of groups of main laminæ having certain inner and outer diameters, and groups of laminæ having the same outer but a greater inner diameter than the main laminæ, whereby circumferential ventilating passageways, closed at the outer periphery of the core, are formed.

16. In a dynamo-electric machine, a field frame, field-poles extending inwardly therefrom, said poles having parallel ventilating passageways at right angles to the axis of the machine, coils on said poles, and a plurality of ventilating collars on said poles having passageways communicating with the first named passageways.

17. In a dynamo-electric machine, a field frame, laminated field-poles extending inwardly therefrom, said field poles having parallel ventilating passageways between the laminæ, field coils on said poles, and a plurality of coil-seats having ventilating passageways communicating with the passageways in the poles.

18. In a dynamo-electric machine, a rotor having circumferential passageways closed at the periphery thereof, a completely inclosing field casing or frame having air inlet and outlet openings, field poles extending inwardly from said casing, each of said field poles having parallel ventilating passageways closed at the ends of the poles and communicating with the spaces between the poles, and a fan on the shaft at one end of the casing for forcing air through the passageways of the rotor and through the passageways of the field poles.

19. In a dynamo-electric machine, a laminated armature having circumferential passageways closed at the periphery of the core and axial passageways communicating therewith, an inclosing field casing or frame having laminated field poles extending inwardly therefrom, coils on said field poles, said poles having passageways in the poles communicating with the spaces between the poles, and means for forcing air through the passageways in the armature and through the passageways in the field poles.

In testimony whereof I affix my signature, in the presence of two witnesses.

CHARLES E. LORD.

Witnesses:
ARTHUR F. KWIS,
FRED J. KINSEY.